UNITED STATES PATENT OFFICE.

CLINTON E. DOLBEAR, OF LOS ANGELES, CALIFORNIA, ASSIGNOR, BY DIRECT AND MESNE ASSIGNMENTS, OF THREE-FOURTHS TO DAVID C. NORCROSS AND ONE-FOURTH TO JOHN H. MILLER AND GEORGE J. HENRY, ALL OF SAN FRANCISCO, CALIFORNIA.

PROCESS FOR RECOVERING POTASSIUM COMPOUNDS FROM BRINES CONTAINING THE SAME IN ASSOCIATION WITH OTHER CHEMICAL COMPOUNDS.

1,394,978.   Specification of Letters Patent.   Patented Oct. 25, 1921.

No Drawing.   Application filed March 10, 1919. Serial No. 281,650.

*To all whom it may concern:*

Be it known that I, CLINTON E. DOLBEAR, a citizen of the United States, and a resident of the city of Los Angeles, county of Los Angeles, State of California, have made a new and useful Invention—to wit, A Process for Recovering Potassium Compounds From Brines Containing the Same in Association With other Chemical Compounds; and I do hereby declare the following to be a written description of the same in such full, clear, concise, and exact terms as to enable any person skilled in the art to which it appertains or with which it is most nearly connected to use and practise the process.

The primary object of this invention is to recover in a simple, cheap, and effective manner potassium compounds carried in brines containing the same in association with other chemical compounds. Such brines I denominate "complex brines", and they are found in the natural waters of several western lakes, notably in Searles Lake in California. It has heretofore been found very difficult to recover the potassium compounds from such brines due to the complex nature of such brines caused by the association of other chemical compounds with the potassium compounds, whereas in a simple brine carrying only potassium and certain sodium compounds the recovery of the potassium compounds is easily effected by well known methods. The fundamental principle underlying my invention consists in first converting these complex brines into simple brines carrying only sodium and potassium compounds from which the potassium compounds are easily recoverable.

Many efforts have been made by various persons to recover the potassium compounds from such complex brines, but with indifferent success.

In all such instances the potassium compounds recovered are found to be mixed with boron or arsenic compounds or other impurities, which reduce the value of the product and which necessitate great cost and expense for removal. Furthermore, the processes heretofore used for such purpose are complicated and excessively expensive, requiring extensive reduction works and the investment of large capital. As a result no one has heretofore been able to commercially produce a comparatively pure potassium compound from these complex brines.

The complex brines upon which I propose to operate may be typified by the brine of Searles Lake, California, and I shall therefore describe my invention as applied thereto, it being understood however that the invention is not limited to the Searles Lake brine, but may be applied to other complex brines analogous thereto.

The brine of Searles Lake carries in solution sodium chlorid, sodium sulfate, sodium carbonate, sodium borate, potassium chlorid, and arsenic tri-sulfid. Using the ordinary chemical symbols, I give the following as the correct quantitative analysis of the Searles Lake brine:

$NaCl$ _ _ _ _ _ 16.5 per cent.
$Na_2SO_4$ _ _ _ 6.9 per cent.
$Na_2CO_3$ _ _ _ 4.7 per cent.
$Na_2B_4O_7$ _ _ 1.5 per cent.
$KCl$ _ _ _ _ _ _ 4.75 per cent.
$As_2S_3$ _ _ _ _ _ Less than one per cent.

In carrying out my invention I take the brine as it comes from the lake and add thereto calcium sulfate, or its equivalent gypsum, in quantity at least equal to the chemical equivalent of the contained sodium carbonate and sodium borate. I then apply heat to the mixture at or near the boiling point. Thereupon the sodium carbonate reacts with the calcium sulfate quantitatively, resulting in the formation of sodium sulfate and calcium carbonate, and also the sodium borate reacts with the calcium sulfate quantitatively resulting in the formation of calcium borate and sodium sulfate. Inasmuch as calcium carbonate, calcium borate and arsenic tri-sulfid are now insoluble, they are precipitated as inert masses and then removed by any convenient method. The precipitation of the calcium salts under these conditions carries down with it the finely divided precipitate of arsenic tri-sulfid which has been rendered insoluble by the conversion of the sodium carbonate to sodium sulfate, it having been before held in solution by the sodium carbonate. The reaction in the presence of the calcium sulfate neutralizes the brine and thus causes the precipitation of the said arsenic tri-sulfid. The arsenic trisulfid is held in solution because the solution is alkaline, due to the presence of the sodium carbonate, (or borate or the like). It is to be understood that the arsenic trisulfid is soluble only in the alkaline solution and upon neutralizing the solution becomes insoluble and therefore subject to ready separation. This leaves a simple brine containing in solution only sodium chlorid, sodium sulfate, and potassium chlorid. These reactions are explained by the following chemical equation, in the second member of which I have placed the soluble constituents in one column and the insoluble in another column, viz:

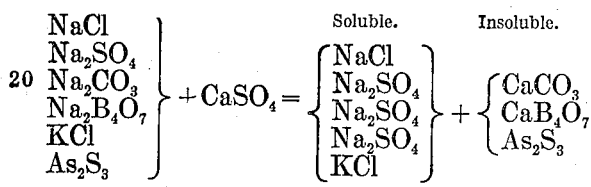

After the removal of the above specified insoluble constituents, potassium chlorid is easily recovered from the simple brine remaining either by evaporation and fractional crystallization or any other well known method, and when so recovered is a commercial product of comparative purity.

As a modification of the above process, I may treat the complex brine with calcium sulfate without heating. In such case the sodium carbonate alone will be affected by the calcium sulfate, thus leaving the sodium borate in solution, and after separating the insoluble calcium carbonate from the mixture I add a further quantity of calcium sulfate and then heat the mixture, in which case the sodium borate will be converted into calcuim borate, and together with the arsenic trisulfid will be precipitated, after which the potassium chlorid can be recovered as already described.

I have also discovered that if the sodium carbonate is eliminated from the brine as last above specified and without the aid of heat, and if then the brine is separated from the insoluble material, I may treat the remaining brine with aluminum sulfate. By such operation aluminum borate and arsenic tri-sulfid are precipitated, accompanied by the formation of more sodium sulfate in the brine, and the brine can then be treated as before for the recovery of the potassium chlorid. As a by-process of the last above described operation, the precipitated aluminum borate and arsenic tri-sulfid can then be treated with sulfuric acid, whereby aluminum sulfate and boric acid are formed, both of which are soluble in warm or hot water, while on the other hand the arsenic is insoluble in an acid solution. Then by filtration the arsenic can be separated from the solution and the boric acid will crystallize from the solution leaving aluminum sulfate in solution, which can again be used to precipitate more borax and arsenic, thus making the process cyclic.

Having now fully described my invention, I make the following claims:

1. The process of converting a solution carrying carbonates or borates or both and carrying also potassium compounds into a simple brine carrying only potassium and certain sodium compounds, which consists in treating such solution with calcium sulfate and then removing the insoluble matter resulting from the reaction.

2. The process of recovering potassium compounds from the natural waters of Searles Lake, which consists in treating said waters with calcium sulfate, removing the insoluble matter resulting from the reaction and recovering the potassium compounds from the remaining solution.

3. The process of recovering potassium salts from solutions which contain potassium compounds and also carbonates or borates, or both consisting of the treatment of said solution with calcium sulfate, then separating the precipitate resulting therefrom, and then removing the potassium from the resulting solution.

4. The process of recovering potassium salts from an alkaline solution containing potassium salts and carbonates or borates, or both by adding calcium sulfate.

5. The process of converting a solution carrying carbonates or borates or both and carrying also potassium compounds into a simple brine carrying only potassium and certain sodium compounds, which consists in treating such solution with calcium sulfate, heating the same to or near the boiling point, and then removing the insoluble matter resulting from the reaction.

6. The process of recovering potassium compound from a solution carrying also carbonates or borates or both and carrying such compounds associated with other chemical compounds, which consists in treating such solution with calcium sulfate, heating the same to or near the boiling point, removing the insoluble matter resulting from the reaction, and then recovering the potassium compound from the remaining brine.

7. The process of recovering potassium compounds from a solution carrying also carbonates or borates or both and carrying such compounds associated with other chemical compounds, which consists in treating such solution with calcium sulfate in the absence of heat, removing such insoluble matter as may result from the reaction, then adding additional calcium sulfate and heating the mixture to or near the boiling point, removing such insoluble matter as may result from this reaction, and finally recovering the potassium compound from the remaining solution.

8. The process of recovering potassium salts from an alkaline solution containing potassium salts and carbonates or borates or both by adding calcium sulfate and heating.

9. The process of recovering potassium salts from solutions containing carbonates, borates and arsenic tri-sulfate consisting of the addition of calcium sulfate thereto, and after reaching neutrality, separating the precipitate and thereafter recovering the potassium salts from the remaining solution.

In testimony whereof, I have hereunto set my hand at San Francisco, California, this 4th day of March, 1919.

CLINTON E. DOLBEAR.

In presence of—
JOHN H. MILLER,
GENEVIEVE S. DONELIN.